United States Patent [19]
La France

[11] 3,787,716
[45] Jan. 22, 1974

[54] LINEAR PULSED D.C. MOTOR AND CONTROLS THEREFOR

[75] Inventor: Robert C. La France, Los Angeles, Calif.

[73] Assignee: The Aerospace Corporation, Los Angeles, Calif.

[22] Filed: Feb. 16, 1972

[21] Appl. No.: 226,749

[52] U.S. Cl................ 318/135, 318/254, 318/603, 310/12, 104/138
[51] Int. Cl. .......................................... H02k 41/02
[58] Field of Search ........... 318/138, 254, 135, 603; 310/12, 13, 14, 31-35; 104/138

[56] References Cited
UNITED STATES PATENTS

| | | | |
|---|---|---|---|
| 3,206,665 | 9/1965 | Burlingham | 318/603 X |
| 3,575,650 | 4/1971 | Fengler | 310/12 X |
| 3,165,685 | 1/1965 | Maneuffel et al. | 318/138 |
| 3,523,230 | 8/1970 | York | 318/138 X |
| 3,456,136 | 7/1969 | Pierro | 310/12 |
| 3,532,949 | 10/1970 | Williams et al. | 318/138 |
| 3,403,634 | 10/1968 | Crowder | 310/12 X |
| 3,225,228 | 12/1965 | Roshala | 310/12 |
| 3,548,273 | 12/1970 | Parodi et al. | 318/138 |
| 3,594,622 | 7/1971 | Inagaki | 318/135 |
| 3,407,749 | 10/1968 | Frig | 318/135 X |
| 2,589,998 | 3/1952 | Dougherty et al. | 318/55 |

Primary Examiner—T. E. Lynch
Attorney, Agent, or Firm—Francis R. Reilly

[57] ABSTRACT

A linear D. C. motor for a track guided vehicle, the motor stator consisting of a series of uniformly spaced permanent magnets mounted along the track acting in conjunction with a vehicle attached elongated "rotor." A series of D. C. excited coils in slots across the face of the rotor react with the air gap flux between the magnets and the rotor to propel the vehicle. Automatic controls are provided to sequence excitation of the coils and control coil current to maintain precise selected vehicle velocity and position and also to respond to commands to incrementally change vehicle position with respect to another vehicle traveling at the same velocity and to effect other vehicle operations.

8 Claims, 6 Drawing Figures

| COIL CONDITION | COIL SETS | | | | | | | | | | | |
|---|---|---|---|---|---|---|---|---|---|---|---|---|
| | 1 | 2 | 3 | 4 | 5 | 6 | 1' | 2' | 3' | 4' | 5' | 6' |
| A' | ⊕ | ⊕ | ⊕ | ○ | ○ | ○ | ⊙ | ⊙ | ⊙ | | | |
| B' | ○ | ⊕ | ⊕ | ⊕ | ○ | ○ | ○ | ⊙ | ⊙ | ⊙ | ○ | ○ |
| C' | ○ | ○ | ⊕ | ⊕ | ⊕ | ○ | ○ | ○ | ⊙ | ⊙ | ⊙ | ○ |
| D' | ○ | ○ | ○ | ⊕ | ⊕ | ⊕ | ○ | ○ | ○ | ⊙ | ⊙ | ⊙ |
| E' | ⊙ | ○ | ○ | ○ | ⊕ | ⊕ | ⊕ | ○ | ○ | ○ | ⊙ | ⊙ |
| F' | ⊙ | ⊙ | ○ | ○ | ○ | ⊕ | ⊕ | ⊕ | ○ | ○ | ○ | ⊙ |
| ↓ | | | | | | | | | | | | |
| L' | ⊕ | ⊕ | ○ | ○ | ○ | ⊙ | ⊙ | ⊙ | ○ | ○ | ○ | ⊕ |

⊕ CURRENT DOWN
⊙ CURRENT UP
○ NO CURRENT

FIG. 4a

| POLE POSITION | POLE DETECTORS | | | | | | COMMAND COIL SETS TO STEP |
|---|---|---|---|---|---|---|---|
| | a | b | c | d | e | f | |
| A | S | S | S | 0 | 0 | 0 | A' |
| B | 0 | S | S | S | 0 | 0 | B' |
| C | 0 | 0 | S | S | S | 0 | C' |
| D | 0 | 0 | 0 | S | S | S | D' |
| E | N | 0 | 0 | 0 | S | S | E' |
| F | N | N | 0 | 0 | 0 | S | F' |
| ↓ | | | | | | | |
| L | S | S | 0 | 0 | 0 | N | L' |

FIG. 4b

LINEAR PULSED D.C. MOTOR AND CONTROLS THEREFOR

BACKGROUND OF THE INVENTION

1. Field of the Invention

The invention relates to a D. C. linear motor with means to sequentially energize motor armature windings. The motor velocity is controlled to operate in a synchronous mode.

2. Description of the Prior Art vehicle congestion on roadway systems, together with associated air and noise pollution, has dictated the development of a high capacity vehicle-guideway system. Such system includes computer controlled small capacity cars routed non-stop from origin to destination. Each car accommodates a single passenger or a small group traveling together to a common destination. High overall system capacity is achieved by operating the vehicles at very close headway, on the order of five feet between vehicles. The guideway for an urban area is a grid network configuration to provide access to and from any locale within the area. The general concept of such system is disclosed in U.S. Pat. No. 3,403,634 issued Oct. 1968 to W. K. Crowder entitled "Automatically Controlled Railway Passenger Vehicle System."

The presently preferred guideway network operation involves an endless series of virtual slots moving at a uniform velocity throughout the system. Each slot is of a length to accommodate a single car with additional length sufficient to provide appropriate bumper-to-bumper clearance between cars. A car entering the network, as from a passenger loading station, is maneuvered up to line velocity and merged into an unoccupied "slot." Thereafter it is controlled to travel via the least time consuming or system efficiency producing route to its preselected destination. Throughout its trip the car is constrained to move in synchronism with its alloted virtual slot. The present invention adds necessary flexibility to the system by the employment of computer controlled instructions to the car propulsion system commanding the car to advance or fall back into an adjacent unoccupied slot. In this mamner a slot may be vacated so as to be available to admit another car entering the line from a station or merging from an intersection switch at a cross line.

The system control comprises a central computer for overall car routing control, along with local control computers for detail control of traffic within specific zones of authority, e.g., guideway intersections and loading/unloading spurs. The local computer determines maneuvers at intersections based on information generated by slot-occupancy and vehicle destination sensors placed at neighboring upstream points. Specifically the local computer directs the cars to advance or slip among adjacent unoccupied slots either to make a slot available for a merging car or to maneuver a car in such position on an infeeding line that it will merge with the main traffic stream into an available slot.

The requirement for safe operation at the very close headways which characterize a high-capacity system introduces, in turn, a spectrum of requirements on the propulsion, braking, vehicle control, and switching elements of such systems. Paramount among these requirements, as they affect propulsion and braking considerations, are the needs for precise control of position and velocity, and for the ability to develop, in a controlled manner, high levels of deceleration (braking) forces independent of weather and traction considerations. These factors, plus several others of somewhat lesser significance, indicate that a linear electric motor would best satisfy all the system-imposed requirements.

Traffic handling considerations in the network control concept dictate that on certain segments of the guideways all vehicles move at the same uniform speed, whereas in maneuver zones (e.g., upstream of intersections) different vehicles may be commanded to follow different velocity profiles while traversing the same section of guideway. This consideration, plus that of cost, indicates that the active elements of the propulsion system (primary windings) are best placed aboard the vehicles, with only the passive elements guideway mounted. However, linear induction and linear synchronous motors both rely on frequency conversion techniques to enable operations at various velocities such as during maneuvers. Locating such frequency conversion equipment aboard the vehicles is too costly and too much of a weight penalty in view of the power levels and frequency range involved. Additionally, in the case of the linear induction motors, there is concern about thrust sensitivity to air gap variation and overall electrical efficiency.

SUMMARY OF THE INVENTION

This invention is directed to a D. C. linear motion motor in which the movable armature is slotted to accommodate sets of windings reacting with the flux fields set up by a linear array of uniformly spaced fixed magnets to provide thrust. The armature carries sensors detecting its motion along the array of magnets and providing an output signal utilized to sequentially energize the coil sets as they cut the flux in the air gap between the magnets and armature.

The invention further includes an automatic motor velocity and position control using the magnet sensors to generate a pole count which in turn is referenced to the output of a fixed frequency pulse generator. Deviations in actual velocity from programmed velocity are detected and converted to error signals. Motor current is increased or decreased in accordance with the sign (+ or −) and magnitude of the error signals. When an error signal is nulled, via magnet sensor feedback, the vehicle will have regained the actual position to which it would have advanced had there been no velocity error. By inputting phantom error signals to the system the vehicle can be advanced or retarded with respect to other vehicles in the network.

BRIEF DESCRIPTION OF THE DRAWINGS

FIGS. 4a. and 4b. are charts showing the sequence of power applied to the motor coils in accordance with their location relative to the stator magnets as determined by pole sensors.

DESCRIPTION OF THE PREFERRED EMBODIMENT

The present invention is directed particularly to a vehicular linear motor, and its velocity and position control, for use in a high capacity guideway network transportation system.

Figure 1:
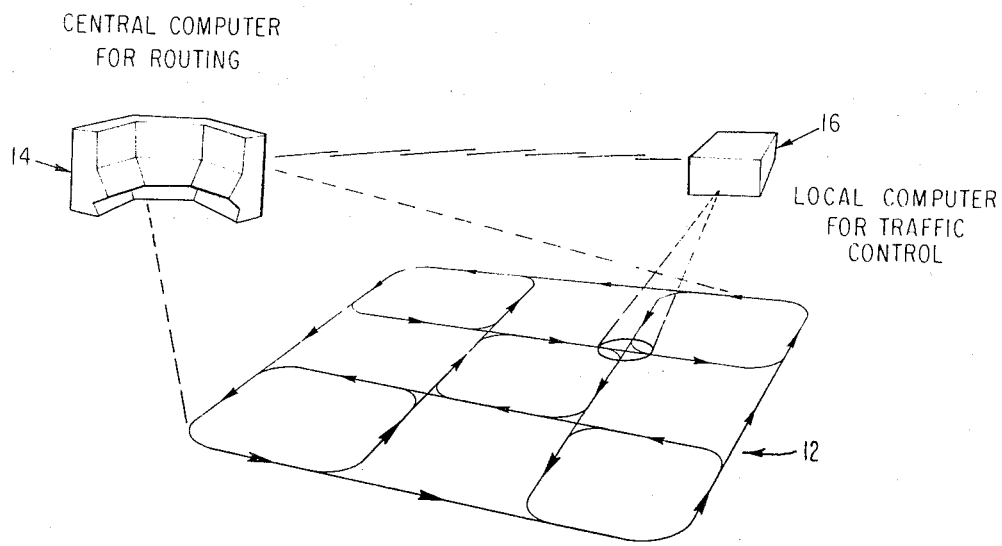
FIG. 1 is a schematic showing of a computer controlled, tracked transportation network.

In FIG. 1 is shown a limited extent, closed loop network 12 of vehicle guideways which in practice is extended throughout the populated area to be served. Characteristic of this system is the feature that the network 12 "runs" as an endless series of virtual slots moving in synchronism at line speed. Each slot accommodates a single car with a slight additional space alloted for clearance between adjacent cars, i.e. headway. Once a car moves into its slot in the network it is constrained to move at slot velocity until it reaches its destination. At that point the car is moved off line to a station siding and then decelerated to a stop. A strictly synchronized system however imposes so many restraints and potential conflict on its operation, it is preferable to add system flexibility by providing the closely supervised transfer of a car forwardly or rearwardly to an unoccupied adjacent slot.

Overall systems operation is under the control of a central computer 14. Thiss computer 14 provides general housekeeping functions as synchronized slot movement, trip charting for cars from any point of origin to any destination, empty car routing and like system necessities. The trip charting involves constant and recurring updating, taking into consideration areas of congestion, temporarily closed guideway segments, emergency situations and the like, all trip charting being effective to assure over all line efficiency at the least inconvenience, timewise, to the individual travelers in reaching their destinations.

Working in close cooperation with central computer 14 is a local or intersection traffic control computer 16. Although only one such local computer 16 is shown in FIG. 1 it is to be understood that each intersection or merge point would have its individual local control computer. These local computers 16 command individual cars through switches to its selected destination in accord with routing instructions received from the central computer 14. Local computer 16 also monitors traffic flow in the crossing lanes, i.e., which slots are occupied by car. With this knowledge cars are maneuvered back or forth to an unoccupied slot (slot slipping and advancing) so as to timely vacate a slot needed to accommodate a merging car. Alternatively, a car, during transition to a cross line through a switch, can be slipped or advanced one or more slots to be put in a proper position to merge into an unoccupied slot on the cross line.

There are many other aspects of systems control which are extensively explained in the literature. From the above brief description it will be appreciated that, in addition to the complex computer programming required, it is paramount that the vehicle propulsion system have the capability of maintaining precise velocity and position control along with the ability to vary velocity momentarily to slip or advance from one virtual slot to another. After such maneuver it must then be promptly brought back to accurate line velocity.

Figure 2:
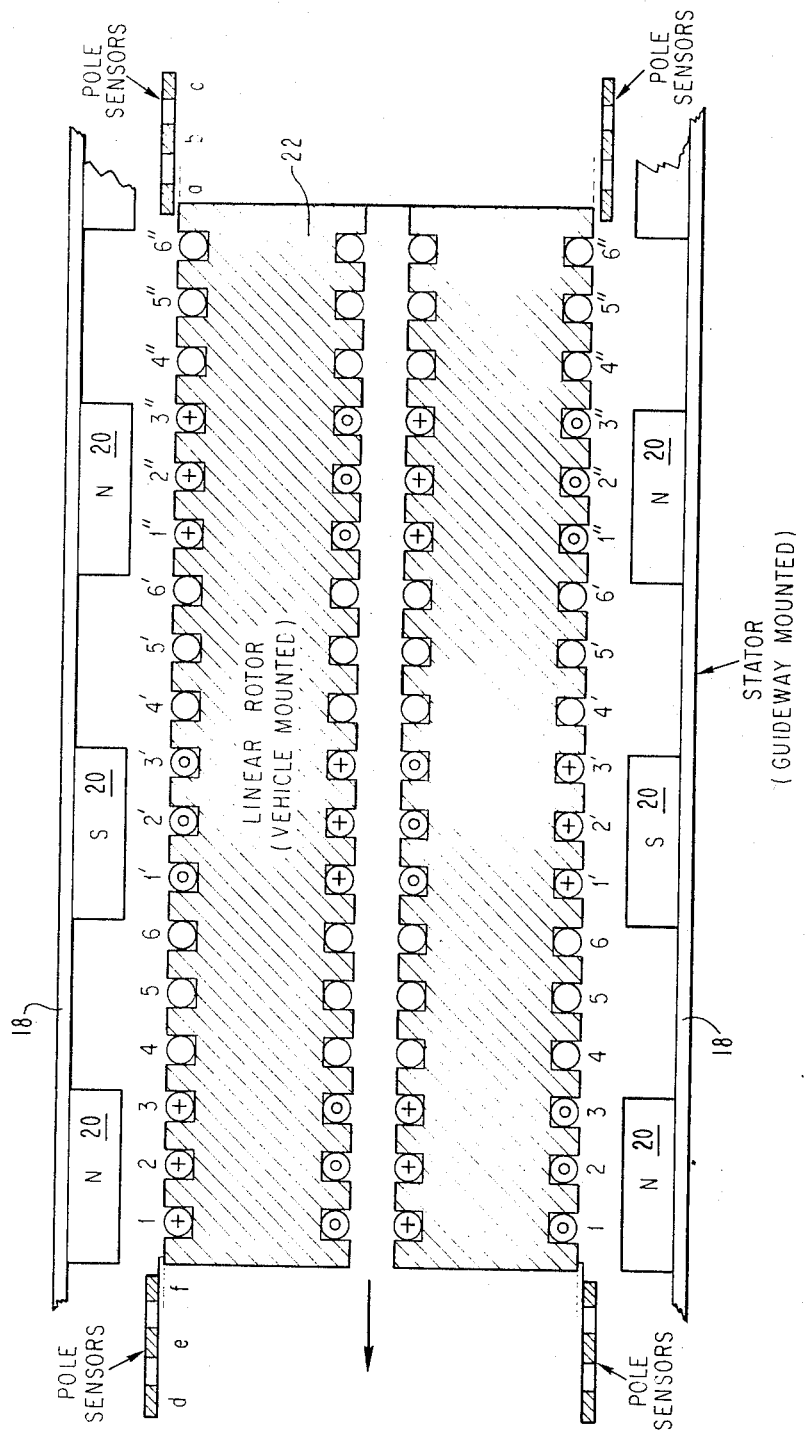
FIG. 2 is a plan, partially sectional view of the linear rotor and stator of the motor of the invention.

The elements of the linear motor stator and "rotor" are shown in FIG. 2. In this figure the stator consists of a pair of parallel side rails 18 which extend throughout the track network 12. On the inner face of each rail 18 is a series of uniformly spaced and sized magnets 20. The exposed faces of magnets 20 are of alternate polarity, and the magnets on one rail 18 are of the same polarity as opposing magnets 20 on the other rail 18. While the magnets 18 may be electromagnets or induced magnets, the use of permanent magnets is considered to be more practical since adequate magnetic strength is now obtainable in permanent magnet materials such as barium and strontium ferrite. In the space between parallel rails 18 is a wound, two part, divided linear "rotor" or primary core 22 fabricated of a material providing a good magnetic flux path between two adjacent magnets 20 when they are bridged by the rotor 22. It is recognized that the most effective winding configuration for this linear motor would be a single, as opposed to a divided, configuration. However, as the minimum desired air gaps between magnets 20 and rotor 22 must be maintained, a single piece rotor would impose impractical tolerance limitations on the construction of side rails 18. By using a split rotor each half can be independently spring mounted, with each half maintaining the design air gap without regard to deviations in the parallel relation of side rails 18.

Each half of rotor 22 is wound with conductor coils 1 through 6, 1' through 6' and 1'' through 6''. Correspondingly numbered coils 1, 1 and 2, 2, etc. are series connected and also series connected with the corresponding coils in the primed and double primed numbered coil sets. It is of course necessary that the coil windings be in the proper direction so that when energized all forces generated will be in the same direction. As later explained each of coils 1–6 are in a separate circuit so they may be independently energized.

For a purpose defined hereinafter, rotor 22 carries two sets of pole sensors $a$ through $f$. These poles sensors $a–f$ have the capability of detecting their presence in the field of any of the magnets 20 and the polarity of the magnets. For this purpose sensors $a–f$ are Hall effect detectors which exhibit a sharp and continuous output in the presence of a magnetic field with their outputs in a north-south field being the reverse of outputs in a south-north field. Pole sensor $a–f$ are position oriented so as to have the same relative position with respect to a rail mounted magnet 20 as do coils 1–6, respectively. Thus, at any time pole sensor $a$ is next to a magnet, coil 1 will be next to a magnet. Whether the magnets adjacent the sensor and coil are the same polarity is of no consequence since the circuitry can be arranged to properly care for this aspect.

Although not here shown, the rotor 22 will be attached to a vehicle to provide a propulsion force thereto. At all times, however, it will be obvious that the rotor must be retained centrally within the rails 18 with a minimum air gap between the rotor 22 and magnets 20.

A number of factors must be considered in properly sizing the magnets, their spacing, and the length of the rotor. The primary or rotor 22 must be physically short enough to traverse the minimum radius guideway turn without touching the magnets. To produce constant thrust the primary 22 and permanent magnets 20 must be configured to result in a nearly constant flux linkage in the magnetic circuit formed by their interaction. A three pole embrace is the minimum length that will accomplish this purpose. Additional length, or multiple primaries, may be required depending on thrust demand.

Figure 3:
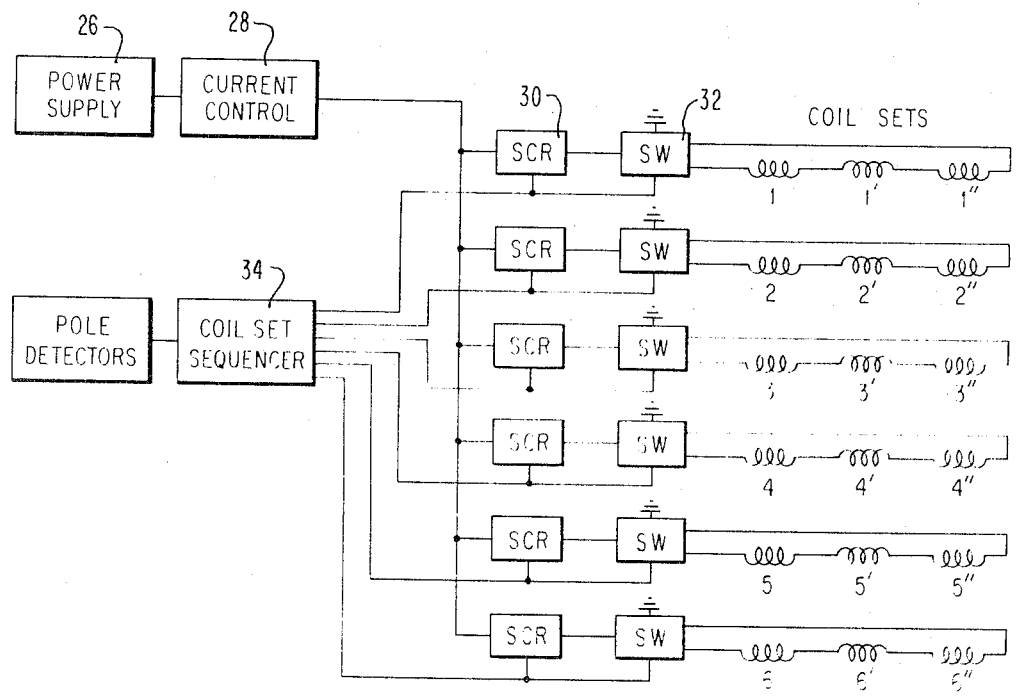
FIG. 3 is a circuit diagram showing the functional units controlling current flow to the motor.

Thrust in the motor is developed by reaction between the field around energized coil conductors 1–6 and the air gap flux field between rotor 22 and magnets 20. An examplary circuit for the energization of the coil conductors is shown in FIG. 3. Referring to this figure, a power supply 26 is fed, via a third rail system, through current control or limiter 28. This limiter 28 varies the thrust of the motor by altering total current in each coil and may be in the form of a solid state pulse width modulation chopper. Power from current control 28 is fed to the respective coil sets 1, 1', 1", etc., via silicon controlled rectifiers (SCRs) 30 and switches (SW) 32 which control or alternate the direction of current flow in the coil sets. The SCR 30 are fired or rendered conducting by a signal voltage received from coil set sequencer 34. When the signal voltage ceases the SCRs are returned to their non-conducting condition. Coil set sequencer 34 also sets switches 32 to conduct current through the coil sets in a direction consistent with the direction of air gap magnetic flux. In actual construction, for reliability and speed, solid state circuit selectors would be used in the stead of mechanical switches.

FIGS. 4a and 4b. respectively show the direction of current flow in the coil sets and the concomitant magnetic sensings of pole detectors a–f. At any given time three conductor sets of each group of six will be energized. Likewise the corresponding three of the six pole detectors will be in magnetic field. Pole detectors a through f are physically oriented relative to coil sets 1 through 6 respectively so that corresponding coil sets and detectors simultaneously enter and leave magnetic flux fields between the magnets 20 and the rotor 22.

At "Pole Position" A, referring to FIG. 4b., pole sensors a, b, and c will be in the position shown at FIG. 2, and each will sense the presence of a south magnet (S). Detectors d, e, and f will be between magnets and thus have no output (O). The outputs of the sensors are amplified and converted to command the coil set sequencer 34 to place the coil sets in condition A' (FIG. 4a.), i.e., coil sets 1, 2 and 3 having current in one direction (+), coil sets 1', 2' and 3' having current in the opposite direction (o) and no (O) current in coils 4, 5 and 6, and 4', 5' and 6'. As the rotor 22 advances from the FIG. 2 position the detectors advance through positions A to L respectively. This advance concurrently sequences the coil sets through conditions A' to L' (FIG. 4a). Current is thus caused to flow in the proper direction through the coil sets and only when the coil sets are in the flux field. Because of the magnetic field fringe the sensors will react and the coils will be energized before they are physically facing a magnet.

Figure 5:
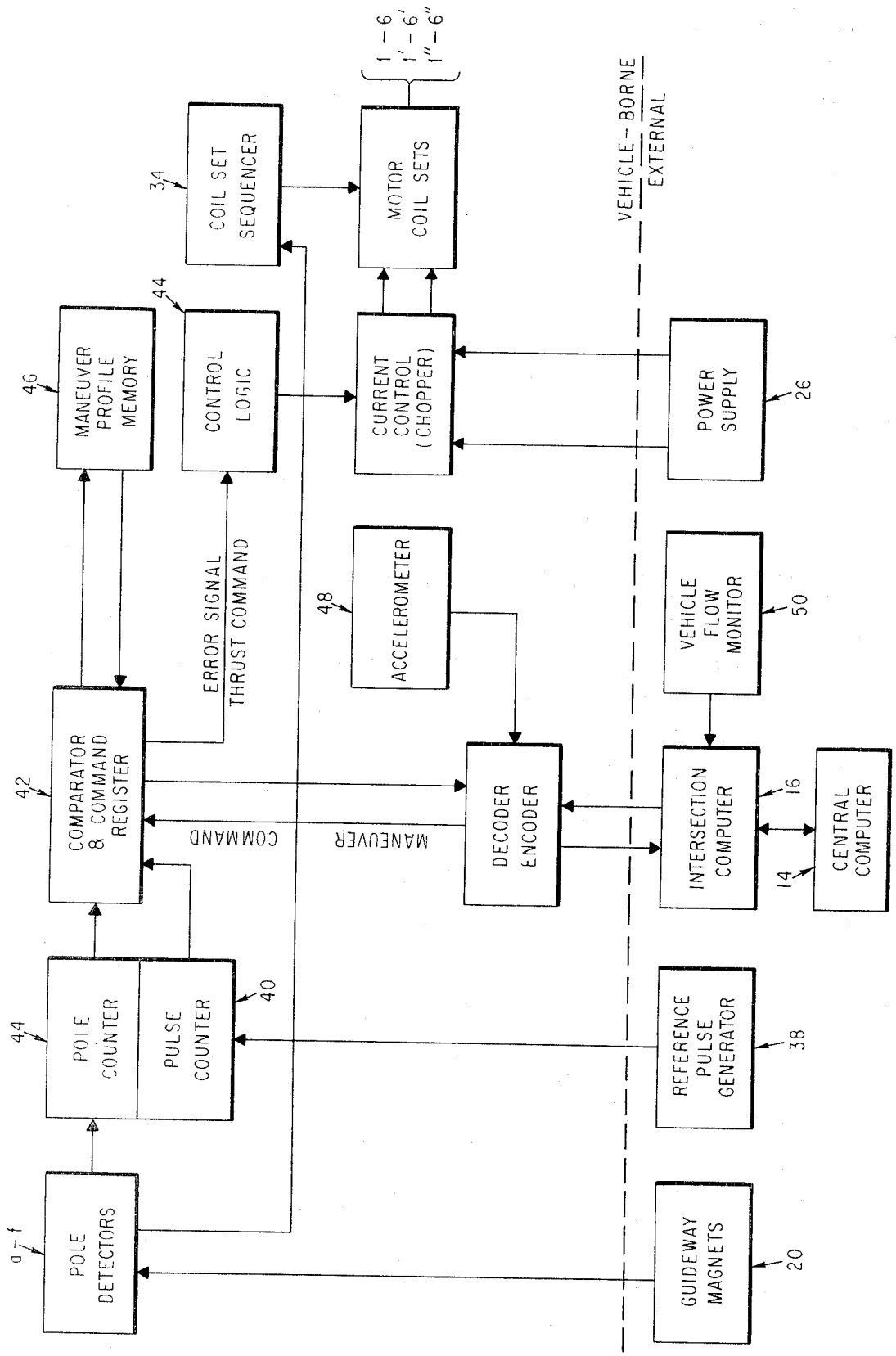
FIG. 5 is a block diagram showing the circuit blocks controlling the operations of the motor.

At FIG. 5 is shown the overall motor control system functioning to maintain selected vehicle velocity and perform vehicle maneuvering. Referring to this figure, a reference pulse generator 38 emits a synchronizing fixed frequency pulse signal received by all vehicles in the network 12. This signal is detected by pulse counter 40, converted, and fed in digital form to one side of the comparator and command register 42. The frequency of the reference pulse is converted to equal the number of magnetic pole detector pulses required per unit of time for a vehicle to be travelling at line velocity. The other side of register 42 receives a digital count from pole counter 44 which sums the pulses from the pole detectors a–f. Comparator 42 subtracts the pole counter count from the pulse counter count and the difference is converted to an error signal. At line velocity no error signal is generated and control logic 44 maintains the current control setting constant. When the subtraction results in a plus difference indicating the vehicle has slowed, as when encountering headwinds or in ascending an incline, a positive error signal is transmitted to control logic 44 which in turn increases the pulsed current to the motor coil sets 1–6 etc., supplied by current control 28. Vehicle velocity will increase to effect an increase in rate of detector pulses to the pole counter 44 until the error signal is nulled. Current flow to the motor coil sets 1–6 thereupon is reduced to normal at which time the vehicle will have regained line velocity and regained position in its assigned virtual network slot. Negative error signals from command register 42, indicating vehicle velocity increase conversely will decrease current to slow the vehicle. Control logic 44, in addition to its response to the sign of the error signal, is modified in accordance with the magnitude of the error to accordingly regulate the degree of increase or decrease of current.

Maneuvering acceleration-deceleration and slot-change profile data are stored in maneuver profile memory 46. These data may be, in one form, sets of phantom pulse count generators which are commanded by the intersection controller 16 to be inputted to comparator and command register 42 to temporarily modify the digital count from the pulse counter 40. This modification alters the beat frequency and the motor speed varies to keep pace with that altered beat.

Intersection computer 16 receives constant updating of traffic flow (slot occupancy) from vehicle flow monitor 50 indicating virtual slots, within the zone of computer 16 jurisdiction, that are occupied or unoccupied by vehicles. Monitor 50 also receives a scheduled destination from each vehicle approaching a switch. Routing schedules received from central computer 14 are stored in computer 16 indicating turn or no turn requirement for each possible car destination. When a vehicle is to be switched to a cross line, computer 15 determines the availability of an open slot in the cross line and if none is or can be made available the vehicle is routed through the switch leaving it to be rerouted to its destination at a downstream switch. If a slot is available in the cross line the vehicle is switched and then, if necessary, advanced or retarded the appropriate number of slots while traversing an off-line maneuver zone, accelerated back to line velocity and then permitted to merge in an empty slot on the cross-line. In the maneuver to a new slot position, intersection computer 16 calls from maneuver profile memory 46 the velocity-distance maneuvering profile that will effect the commanded slot change. The slot change maneuver profile is essentially a fixed number of phantom pulse counts fed to the comparator 42 that will induce an error signal to the control logic 44. When this induced error signal is nulled the car will have assumed its position in the newly assigned virtual slot.

There are numerous maneuver profiles required for various network operations. The details of these maneuvers are however not within the scope of the present invention and are not necessary to a complete understanding of the invention. It is sufficient that the comparator and command register 42 be recognized to have the ability to respond to any vehicle position error or maneuver command, and immediately generate an error signal to correct the position error or cause the vehicle to execute the commanded maneuver. Position control will be inherent to the granularity of one motor coil pitch spacing since the vehicle mounted pole sensors detect instantaneous position relative to coil pitch. Sudden thrust variation will be instantly compensated for and velocity will nominally be at constant synchronous rate without resort to local computer control.

For a full-sized vehicle (6 passengers, 2,400 lb), the motor of this application will weigh approximately 338 lb. and measure 42 inches in length, by 6 inches in height, by 8 inches in width. Rated thrust is 300 lb at a vehicle speed of 60 mph. The motor supply voltage, baselined at 1,000 volts, dc, is fed through the pulse width modulation chopper to the primary coils. There are a total of 48 coil slots (24 on each side) in the primary. These coils are connected such that six coils are in series in a set, with a total of eight sets being required.

The permanent magnets used with this primary are either barium or strontium ferrite with a flux density of approximately 3,000 gauss. The total magnetic pole face area for the entire primary is approximately 150 square inches. Therefore, the magnets were sized at 4 inches in height, 6 inches in length and were spaced on a 1-foot centers, three on each side of the motor primary.

An important characteristic of most electric motors is that they can be run at several times their continuous horsepower rating provided the periods of overload are short. Typical values are three times rated load for 1 minute, five times for 20 seconds and up to eight times for 5 seconds. The linear motor is no exception to this overload capability. The cooling system establishes the duration that these overloads can be sustained without overheating the motor. The linear motor is more easily cooled by convection and conduction than its rotational counterpart because of the open ends and the fact that the primary (rotor) does not move relative to its mount. Thus, the pulsed dc motor described above is capable of producing an extreme overload thrust of 2,400 lb for up to 10 seconds for infrequent emergency situations. Thrusts of this magnitude can be achieved satisfactorily if the coil switching components and permanent magnet sizing are properly selected.

The above described preferred embodiment of my invention may be varied within the scope of the following claims.

I claim:

1. A linear D. C. electric motor comprising:

an elongated stator including a linear array of equidistantly spaced magnets, adjacent magnets being of opposite polarity, a linear rotor guided to travel along the stator, said rotor bridging adjacent magnets and providing a flux path therebetween, a series of sets of independently excitable coil conductors across a face of the rotor confronting the magnets, said conductors reacting with the flux field between the magnets and the rotor to produce thrust, Hall effect detecting means for each set of coil conductors and being mounted on said rotor and moving in proximity to the magnets, said detecting means being position oriented with respect to the conductors and providing an output indicating the position of the conductors relative to the magnets and the polarity of the magnets.

a power supply, a coil conductor set sequencer actuated in response to the output of the detecting means and connecting the power supply to each set of coil conductors upon entry thereof into the flux field said sequencer further controlling the direction of current flow in each set of conductors in accordance with the polarity of the adjacent magnet, a current control means in circuit with the power supply, a fixed frequency pulse generator and, means controlling the current control means in accordance with a comparison of pulses from the pulse generator and the output of at least one of the detecting means.

2. A motor as defined in claim 1 wherein:

the current control means includes a current pulse width modulator.

3. A linear electric motor comprising:

an elongated stator including a linear array of equidistantly spaced magnets, adjacent magnets being of opposite polarity, a linear rotor guided to travel along the stator, said rotor bridging adjacent magnets and providing a flux path therebetween, a series of sets of independently excitable coil conductors across a face of the rotor confronting the magnets, said conductors reacting with the flux field between the magnets and the rotor to produce thrust, detecting means for each set of coil conductors and moving with said rotor, said detecting means being position oriented with respect to the conductors to provide an output indicating the position of the conductors relative to the magnets, a power supply, a coil conductor set sequencer actuated in response to the output of the detecting means and connecting the power supply to each set of coil conductors upon entry thereof into the flux field, a current control means in circuit with the power supply, a time referenced pulse generator, a counter summing the number of outputs of the detecting means, a comparison register differencing the number of pulses generated by the time referenced pulse generator from the outputs summed in the counter, and further providing a command signal as a function of the difference, said current control means being responsive to the command signal to control thrust produced by the coil sets, and, computer means selectively operable to input modifying signals to the comparison register to vary the difference between the pulses and summed outputs whereby to incrementally advance or retard the linear rotor.

4. A linear electric motor comprising:

an elongated stator including first and second parallel linear arrays of equidistantly spaced magnets, adjacent magnets in each array being of opposite polarity, a linear rotor guided to travel between the parallel arrays, said rotor having faces confronting and bridging adjacent magnets in each array and providing a flux path therebetween, a series of sets of independently excitable coil conductors across the faces of the rotor confronting the arrays of magnets, said conductors reacting with the flux field between the magnets and the rotor to produce thrust, detecting means for each set of coil conductors and moving with said rotor, said detecting means being position oriented with respect to the conductors to provide an output indicating the position of the conductors relative to the magnets, a power supply, a coil conductor set sequencer actuated in response to the output of the detecting means and connecting the power supply to each set of coil conductors upon entry thereof into the flux field.

5. A linear electric motor as defined in claim 4 wherein:

the rotor is split into two halves, one of said halves and conductors thereon reacting with one of the parallel arrays and the other of said halves and conductors thereon reacting with the other of the parallel arrays of magnets, said halves of the rotor being independently moveable relative to the arrays to maintain constant spacing therebetween.

6. A motor as defined in claim 4 and further including:

control means for varying power to the motor from the power supply; and motor velocity detecting means providing a command to the control means in accordance with a preselected motor velocity profile.

7. A motor as defined in claim 4 and further including:

a current control means in circuit with the power supply a fixed frequency pulse generator, and, a comparison register receiving pulses from the pulse generator and receiving the output from at least one of the detecting means, said comparison register providing a command output to control the current control means as a function of the ratio of the pulses received to the detecting means output.

8. A motor as defined in claim 4 and further including:

a current control means in circuit with the power supply, a fixed frequency pulse generator, and, means controlling the current control means in accordance with a comparison of pulses from the pulse generator and the output of at least one of the detecting means.

* * * * *